United States Patent
Wagstaff

[11] Patent Number: 5,959,235
[45] Date of Patent: Sep. 28, 1999

[54] FIRE MITIGATION DEVICE

[75] Inventor: Douglas C. Wagstaff, Kidderminster, United Kingdom

[73] Assignee: Royal Ordnance Public Limited Company, Lancashire, United Kingdom

[21] Appl. No.: 08/912,933

[22] Filed: Aug. 15, 1997

Related U.S. Application Data

[63] Continuation of application No. PCT/GB96/00325, Feb. 15, 1996.

[30] Foreign Application Priority Data

Feb. 16, 1995 [GB] United Kingdom .................. 9503080

[51] Int. Cl.[6] .............................. F42B 39/14; F42C 19/08
[52] U.S. Cl. ...................... 102/202; 102/202.1; 102/380; 102/481; 60/223; 60/256
[58] Field of Search .................................... 102/202, 380, 102/481, 202.1; 60/223, 253, 256

[56] References Cited

U.S. PATENT DOCUMENTS

| | | | |
|---|---|---|---|
| 3,713,360 | 1/1973 | Shansey . | |
| 4,478,151 | 10/1984 | Vetter et al. | 102/481 |
| 5,206,456 | 4/1993 | Pracchia et al. | 102/481 |
| 5,427,030 | 6/1995 | Kidd et al. | 102/202 |
| 5,466,537 | 11/1995 | Diede et al. | 102/481 |

FOREIGN PATENT DOCUMENTS

| | | |
|---|---|---|
| A 2 656 085 | 6/1991 | France . |
| 2242008 | 1/1992 | United Kingdom . |

OTHER PUBLICATIONS

Navy Technical Disclosure Bulletin, Navy Case No. 70822, Navy Tech. Cat. No. 6000,2082, vol. 13, No. 2, Jun. 1988, Arlington, VA, US, pp. 25–29, XP000006461 Tawei David Chung et al.: "Removable Hazard Mitigating Device" see abstract.

Incendiary Potential of Exothermic Intermetallic Reactions Technical Report AFATL–TR–71–87, Jul. 1971.

*Primary Examiner*—Harold J. Tudor
*Attorney, Agent, or Firm*—Nixon & Vanderhye P.C.

[57] ABSTRACT

A device for initiating burning of an explosive or propellant material subjected to external heating prior to detonation is described, the device comprising at least two materials, at least a first one of which materials melts at a temperature below the temperature at which detonation of said explosive or propellant material is induced and reacts with said second material to produce an exothermic reaction to cause initiation of burning in said explosive or propellant material.

15 Claims, 2 Drawing Sheets

FIRE MITIGATION DEVICE

This is a continuation of PCT application No. PCT/GB96/00325, filed Feb. 15, 1996.

BACKGROUND OF THE INVENTION

1. Field of the Invention

The present invention relates to a device to mitigate the response of solid fuel propellant motors when subjected to unwanted extraneous heating particularly, though not exclusively, under so-called "slow cookoff" conditions.

2. Discussion of Prior Art

Explosive materials when exposed to heat can react in various ways. Depending upon the nature of the explosive and the rate of heating, the two most common exothermic reactions of explosive materials are ignition and detonation. Desirably, an explosive substance should not react under any conditions other than those of its specific initiation procedure. Furthermore, it should not react either by ignition or detonation at relatively low temperatures of less than about 160° C. However, this is seldom the case.

Explosive materials can be broadly divided into those which are intended to detonate and those which are intended to ignite or burn, albeit very rapidly. The present invention is mainly concerned with the latter type of material, an example of which is propellant material used for applications such as rocket motors.

Propellant materials, based for example on nitrocellulose (NC) or mixtures of nitrocellulose and nitroglycerine (NG), when subjected to extraneous heating at a relatively rapid rate will generally react by producing an ignition event where the material burns rather than detonates. The temperature at which this ignition event occurs is dependent on the heating rate of the material. A typical ignition temperature range for propellants based on cast NC/NG matrices is about 160 to 180° C. at, for example, a heating rate of 5° C. per minute. However, although undesired ignition of a propellant motor is a serious and dangerous event, the potentially more dangerous event of explosive detonation may occur when the material is subjected to a very low heating rate. A heating rate of about 0.05 °C. per minute, for example, from ambient temperature may cause detonation at a temperature of about 120° C.

During a detonation event, substantially all molecules of the material release their chemical energy simultaneously. A slow heating rate serves to bring the majority or all of the molecules in the motor matrix to an energy level where the next increment of heat input takes the material above an activation energy "barrier" to promote a simultaneous reaction causing a detonation event.

SUMMARY OF THE INVENTION

Under conditions of low heating rate it is desirable to be able to stimulate an ignition at a lower energy level and cause the material to burn prior to detonation taking place.

The object of the present invention is to provide a means of initiating ignition of a propellant or propellant igniter before a detonation activation energy level or a temperature at which detonation will occur is reached by the propellant material.

According to the present invention there is provided a device for initiating burning of an explosive or propellant material prior to detonation, the device comprising at least two materials, at least a first one of which materials melts at a temperature below the detonation temperature of said explosive or propellant material and reacts with said second material to produce an exothermic reaction to cause initiation by burning of said explosive or propellant material.

The at least two materials may be metallic materials and the exothermic reaction may be an alloying or chemical reaction between said at least two metallic materials.

In one embodiment of the present invention where initiation of NC/NG matrix materials, for example, is required one of said at least two metallic materials may be sodium metal which melts at approximately 98° C. The second of said at least two materials may be an allow of at least two of bismuth, lead, tin, cadmium, tellurium and antimony; the alloy having a melting temperature beginning at a lower temperature than that of sodium.

In a preferred embodiment of the present invention, the more reactive material may be contained within a jacket of a lower melting temperature, more chemically stable material. This has been found to be advantageous in that, in the case of reactive group 1 metals such as sodium for example, and outer jacket of a bismuth-based alloy, for example, provides protection against reaction of the sodium with substances in the immediate environment (such as oxygen or moisture) during storage, and also promotes mixing of the two metallic components as the molten sodium reacts with the metal of the jacket. If the two components of the device are molten at the point of reaction., a homogeneous phase reaction can occur which promotes liberation of energy compared to a solid/liquid reaction.

The device of the present invention provides a thermal output only, no spark or flame being produced.

It has been found that external case temperatures up to 250° C. may be achieved depending upon the proportions of sodium and bismuth-based alloy components. Temperatures of up to 500° C. have been attained with modified component materials employing additional reactive metal components such as lithium for example.

The device of the present invention may be incorporated into an igniter which in normal usage would be used to initiate burning of the propellant; the device causing initiation of the material in the igniter which in turn ignites the propellant material only if a dangerously high external temperature is achieved. An advantage of including the device in an igniter is that the casing of the igniter serves to contain all the molten components of the device in a relatively small volume, even during the exothermic reaction.

Alternatively, the device may be sited inside the propellant material itself. The device may, for example be attached to the inside surface of a motor casing and propellant cast about the device so as to encapsulate it therein on solidification.

Although the present invention has been described with reference to propellant materials based on NC/NG matrices, the invention is equally applicable to other explosive/propellant materials such as the so-called "composite" propellant materials comprising a matrix of a rubber material having fuel and oxidiser combined therein. Such materials have a temperature at detonation in the range of about 150 to 200° C. depending upon the actual composition and heating rate.

Alloys based on bismuth and/or lead and/or tin are particularly advantageous owing to the wide range of temperatures at which melting may be initiated and the fact that substantially all these alloys react in an exothermic manner with metals from Group 1 of the Periodic Table.

BRIEF DESCRIPTION OF THE DRAWINGS

In order that the present invention may be more fully understood, examples will now be described by way of illustration only with reference to the accompanying drawings, of which:

FIG. 1 shows a cross section of a device according to the present invention incorporated into an igniter.

DETAILED DESCRIPTION OF PREFERRED EMBODIMENTS

Figure 1:
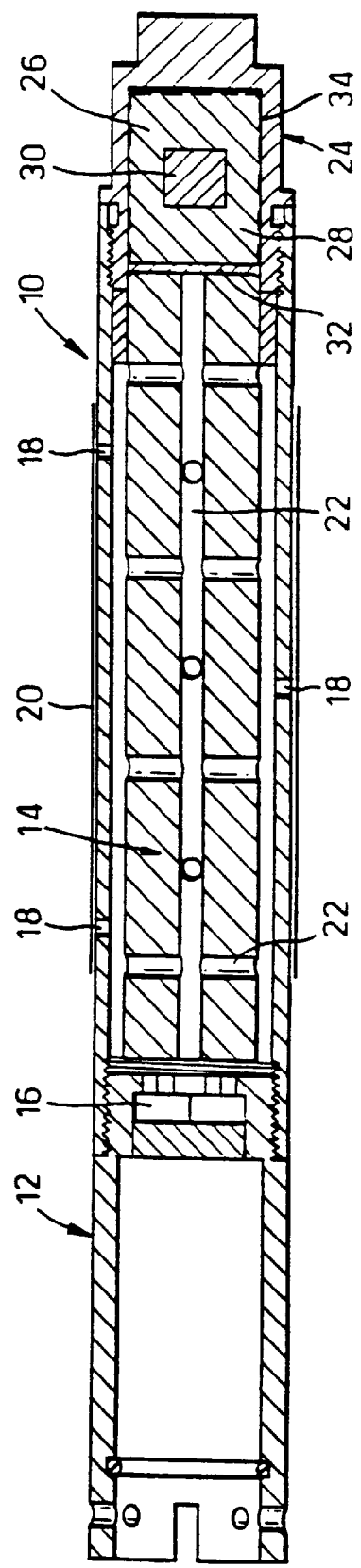

Referring now to the drawings and where FIG. 1 shows a propellant igniter 10 having a device according to the present invention incorporated therein. The igniter comprises an outer casing tube 12 having a pyrogen propellant material 14 therein; the pyrogen propellant material 14 being initiated, under normal conditions, by an electro-explosive device (not shown) and pyrotechnic composition 16. Throats 18 are provided around the periphery of the casing 12 to allow hot gases from the burning pyrogen propellant material 14 to impinge upon and ignite the surrounding propellant material of the rocket motor (not shown). The throats 18 are covered by a membrane 20 to prevent the ingress of moisture when stored. The pyrogen propellant material is provided with conduits and cross holes 22 so as to promote simultaneous burning over a wide area in a short time once initiated. The igniter is also provided with a closed cap member 24 at the end remote from the pyrotechnic composition 16. The cap member 24 contains a device 26 according to the present invention. The device 26 comprises an outer jacket of a bismuth-based alloy 28 of nominal composition 50 wt % Bi; 27 wt % Pb; 13 wt % Sn; 10 wt %Cd, the jacket having therein a pellet of sodium 30. At the open end of the cap member 24 is a shim member 32 of aluminium situated between the device 26 and the pyrogen propellant 14 in order to prevent the device itself from burning under normal initiation conditions of the igniter. Surrounding the device 26 is a thin layer of thermal insulation material and aluminium foil 34 indicated as a heavy dashed line.

The igniter 10 on being subjected to unwanted extraneous heating eventually causes the sodium pellet 30 to melt within the Jacket 28 when the temperature of the sodium reaches about 98° C. The composition of the jacket 28 is such that the onset of melting occurs at a temperature slightly below 98° C. The molten sodium begins to react exothermically with the molten jacket material which accelerates the rate of reaction. The rate of temperature rise and rate of liberation of heat is sufficient to cause the pyrogen propellant material 14 to ignite thus initiating burning of the surrounding propellant material in the rocket motor (not shown), the operation of the igniter 10 being substantially the same as if it had been initiated by the pyrotechnic composition 16.

Figure 2:
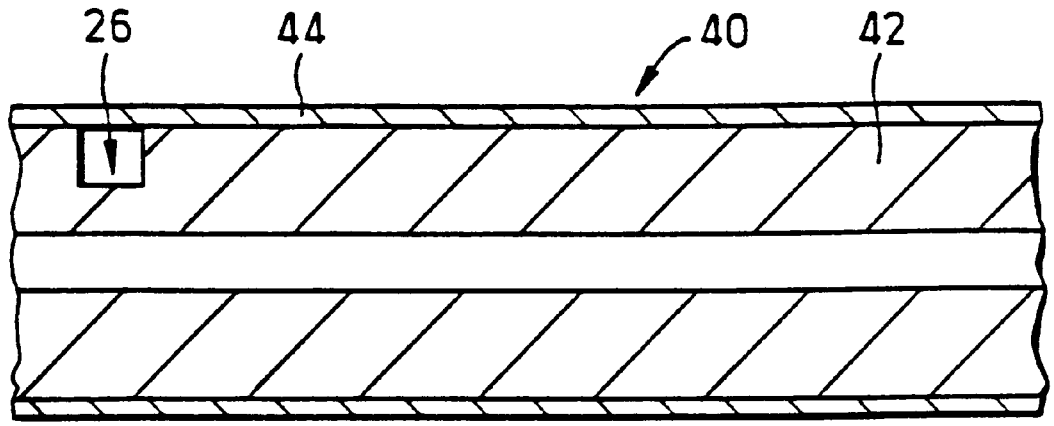
FIG. 2 shows a schematic cross section of an alternative embodiment wherein a device according to the present invention is incorporated into a propellant motor.

FIG. 2 shows a schematic cross section through a propellant motor having a device 26 according to the present invention installed therein. The motor 40 comprises a castable material 42 within a motor casing 44. The device 26 is attached to the inside of the casing 44 by, for example, adhesive means and the propellant material is cast into the casing to solidify around the device. The operation of the device per se is the same as described with reference to FIG. 1, the heat of the exothermic reaction causing initiation of the material 42.

Figure 3:
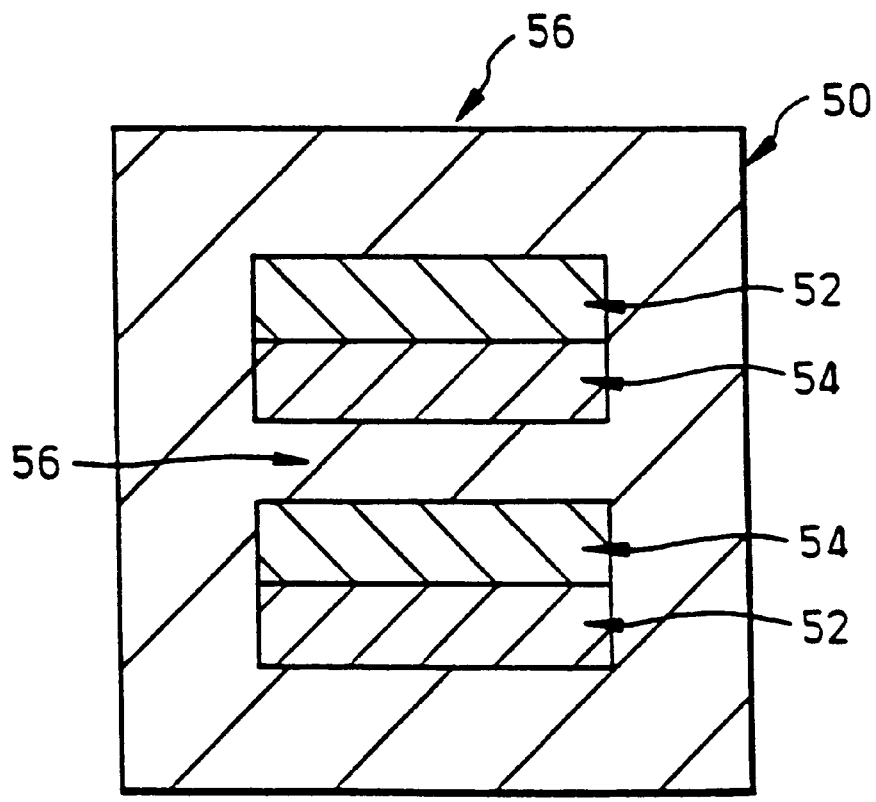
FIG. 3 which shows a schematic cross section of a second embodiment of a device according to the present invention.

FIG. 3 shows an axial cross section through an alternative embodiment of the present invention wherein a device 50 comprises two concentric interfitted cylinders of lithium 52 and sodium 54, respectively, encapsulated within a jacket of a bismuth-based alloy 56. In this embodiment, the sodium 54 again melts first and reacts rapidly with the lithium 52 in an exothermic manner and with the surrounding molten bismuth alloy jacket material 56. The overall reaction between the three components of the device is substantially more exothermic than the device described with reference to FIGS. 1 and 2. Devices constructed according to this embodiment have generated temperatures of up to 500° C.

The mitigation device described in FIG. 3 may either be incorporated into an igniter similar to that described with reference to FIG. 1 or may be directly incorporated into a propellant motor as described with reference to FIG. 2.

I claim:

1. A device for initiating burning of an explosive or propellant material prior to detonation, the device comprising at least two materials, one of said materials being more reactive than the other of said at least two materials, at least a first one of said materials melts at a temperature below the detonation temperature of said explosive or propellant material and reacts with said second material to produce an exothermic reaction to cause initiation by burning of said explosive or propellant material, wherein said more reactive material is contained on all sides within a jacket made of said other of said at least two materials.

2. A device according to claim 1 wherein the at least two materials are metallic materials and the exothermic reaction is a chemical reaction between said metallic materials.

3. A device according to claim 1 wherein one of said at least two materials is sodium metal.

4. A device according to claim 1 wherein the second of said at least two materials is an alloy of at least two of bismuth, lead, tin, cadmium, tellurium and antimony.

5. A device according to claim 3 wherein the second of said at least two materials has a melting temperature lower than that of said sodium metal.

6. A device according to claim 1 wherein only a thermal output is produced by said exothermic reaction.

7. An igniter including the device of claim 1.

8. A propellant motor including the device of claim 1.

9. A propellant motor including the igniter of claim 7.

10. A device for initiating burning of an explosive or propellant material prior to detonation, the device comprising at least two materials, one of said materials being more reactive than the other of said at least two materials, at least a first one of said materials melts at a temperature below the detonation temperature of said explosive or propellant material and reacts with said second material to produce an exothermic reaction to cause initiation by burning of said explosive or propellant material, wherein said more reactive material is contained on all sides within a jacket made of said other of said at least two materials wherein at least three materials are employed, one of which is lithium which is contained on all sides within said jacket.

11. A device according to claim 10, wherein another of said at least three materials is sodium and a third of said at least three materials is an alloy including bismuth having a melting temperature slightly below the melting temperature of sodium, wherein said sodium and lithium are encapsulated within a jacket of said alloy.

12. A device according to claim 11, wherein said sodium and lithium materials are in physical contact with each other.

13. A device for initiating a material comprised of a mixture of nitrocellulose and nitroglycerine prior to detonation, the device comprising at least two materials, one of said two materials comprising sodium metal which melts at a temperature below the detonation temperature of said mixture, said other of said two materials comprising an alloy comprising at least two of the metals selected from the group consisting of bismuth, lead, tin, cadmium, tellurium and antimony, said alloy having a melting temperature below that of said sodium metal, said sodium metal reacts with said alloy to produce an exothermic reaction to cause initiation by burning of said mixture, wherein said sodium metal is contained on all sides within a jacket made of said alloy.

14. A device according to claim 13, wherein said alloy includes bismuth.

15. A device according to claim 14, wherein said alloy is comprised of about 50 wt % bismuth, 27 wt % lead, 13 wt % tin and 10 wt % cadmium.

* * * * *